United States Patent
Mills

[11] 3,759,127
[45] Sept. 18, 1973

[54] IRIS TYPE CUT OFF KNIFE
[75] Inventor: Donald N. Mills, Fonthill, Ontario, Canada
[73] Assignee: Union Carbide Canada Limited, Toronto, Ontario, Canada
[22] Filed: Feb. 11, 1972
[21] Appl. No.: 225,464

[30] Foreign Application Priority Data
Jan. 6, 1972 Canada .................................. 131773

[52] U.S. Cl. ....................... 83/318, 83/314, 83/483, 83/580, 83/646
[51] Int. Cl. ........................................... B23d 25/04
[58] Field of Search ...................... 83/483, 490, 646, 83/647.5, 580, 318, 314, 600; 82/53.1, 57, 58, 83/64; 30/10

[56] References Cited
UNITED STATES PATENTS
3,600,991  8/1971  Kojama et al. ..................... 82/53.1
3,097,556  7/1963  Mackey ............................. 83/314 X
3,540,333  11/1970  Johnson .................................. 82/64
2,334,577  11/1943  Postlewaite ....................... 83/598 X Primary Examiner—J. M. Meister
Attorney—William G. Hopley

[57]  ABSTRACT

An iris type cutting apparatus for cutting stock, particularly cylindrical or tubular carbon electrodes, is described. The apparatus consists generally of a plurality of rotatable shafts mounted on a framework and spaced around the stock, each shaft carrying an eccentrically mounted platelike circular cutting knife adapted for rotation with the shaft and a means on said apparatus for causing all the shafts to rotate simultaneously to carry the knives simultaneously toward and to cut at least part way into the stock and away from the stock.

8 Claims, 5 Drawing Figures

PATENTED SEP 18 1973 3,759,127

IRIS TYPE CUT OFF KNIFE

This invention relates generally to apparatus adapted to cut stock, and has to do particularly with an apparatus utilizing an iris-type cutting principle with circular knives for severing continuously moving tubular stock.

Most of the conventional approaches to the problem of cutting stock involve the provisions of one or more blades which are adapted to move radially inwardly toward the axis of the stock while the stock and the blade or blades are moved angularly with respect to each other. This angular movement can involve a non-rotating tubular or cylindrical stock and a rotating set of blades, or a substantially stationary set of blades and a rotating tubular or cylindrical stock. Occasionally, the blades and the stock are rotated in oppostedirections as the knives move radially inwardly. Naturally, where mutual angular displacement between the stock and the knives takes place, a certain amount of complicated structure is required to permit this mutual angular displacement. If the knives rotate, an elaborate structural rotating framework must be provided. Because certain kinds of tubular stock, such as helically wrapped thin-walled paper tubing, are automatically rotated while they are being produced, devices for cutting such rotating stock need not necessary include provision for rotating the knives. However, other kinds of stock, such as a cylindrical carbon extrusion intended for use as electrodes in electric smelting, etc., are not rotated as they are manufactured, and in this case some movement of the cutting means with respect to the extruded stock is usually required to facilitate cutting.

With particular reference to non-rotating tubular or cylindrical stock intended to be cut immediately after extrusion, the conventional alternatives to causing the knife means to circle the stock while moving radially inwardly also have certain disadvantages. For example, simply cutting through the tubular stock with a rectilinear knife edge or saw blade which is adapted to reciprocate rectilinearly could easily cause breakage and chipping at the last portion of the cross-section to be severed. This could distort the cross-section at the point of severance and make it extremely difficult to fit the cut piece of tubular stock into a holder or sleeve.

In view of the above disadvantages of the prior art, it is an object of this invention to provide a cutting apparatus for stock which is adapted to cut the stock radially inwardly at a plurality of locations, but which does not require a rotating structure to hold the cutting means.

Accordingly, this invention provides cutting apparatus for stock, comprising: a framework supporting a plurality greater than two of rotatable shafts spaced around the stock and parallel therewith, each shaft carrying an eccentrically mounted, plate-like circular cutting knife adapted for rotation with the shaft, all knives being substantially in the same plane, and means for causing all shafts to rotate simultaneously to carry the knives simultaneously towards and away from the tubular stock, the knives at their furthest inward positions cooperating to cut at least part-way into the tubular stock.

Further features, objects and advantages of this invention will become apparent throughout the remainder of this disclosure, which describes one embodiment of this invention with reference to the accompanying drawings, in which like numerals denote like parts throughout the several views, and in which.

Figure 1:
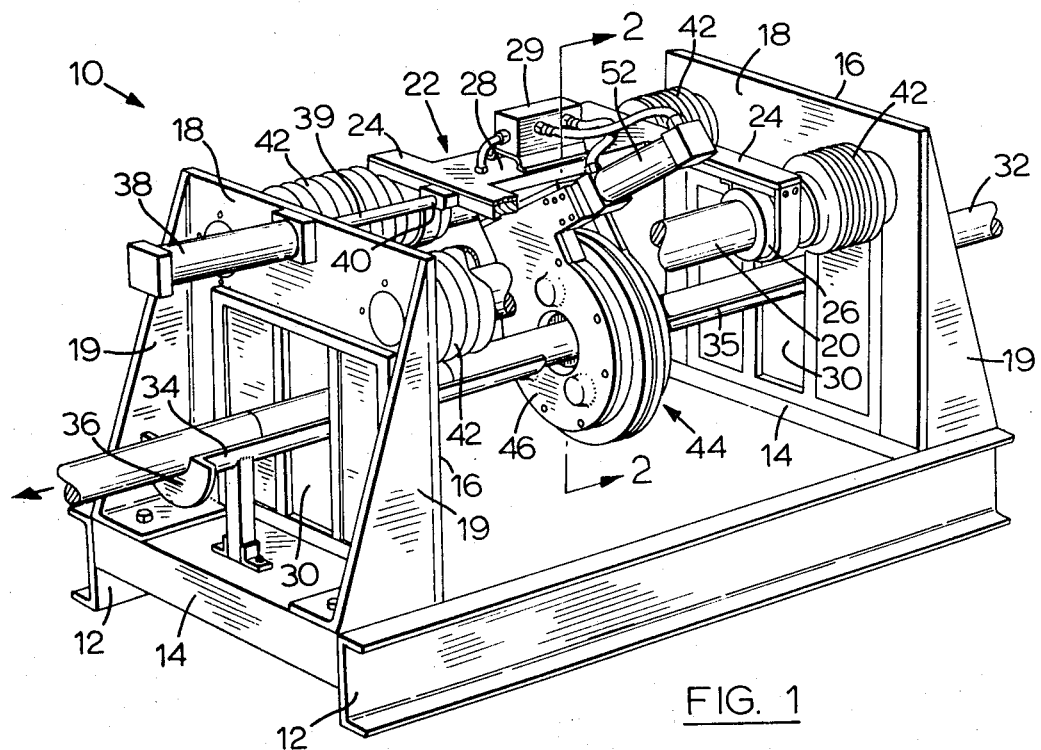
FIG. 1 is a partly broken-away perspective view of the cutting apparatus of this invention.

Attention is first directed to FIG. 1, where a cutting apparatus shown generally at 10 is seen to include longitudinal frame members 12, lateral frame members 14 and two spaced-apart upright end frames 16, each extending upwardly from one of the lateral frame members 14. Each upright end frame 16 includes a vertical plate 18, and the two vertical plates 18 are aligned in spaced-apart parallel relation. The upright end frames 16 also include angle support members 19 to maintain the vertical plates 18 in upright relation with respect to the longitudinal frame members 12.

Two slide-shafts 20 (only one visible in FIG. 1) extend between the vertical plates 18, one slide-shaft at each of the upper corners thereof. The slide-shafts 20 lie in the same horizontal plane, and are parallel and spaced apart.

Mounted on the slide-shafts 20 for reciprocating movement therealong is a sliding frame 22 which includes two horizontal members 24, each having secured to either end a cylindrical sleeve 26 which snugly but slidably embraces the slide-shafts 20. Only one cylindrical sleeve 26 is visible in FIG. 1. Extending between the horizontal members 24 is a plate member 28 which supports a hydraulic control box 29.

Each of the vertical plates 18 has a lower central opening 30 through which cylindrical stock 32 is adapted to pass from right to left as seen in FIG. 1. For purposes of the description of the embodiment shown in the drawings, it will be assumed that the stock 32 is a solid extruded cylinder and that it does not rotate while being extruded. It is to be appreciated, however, that other types of stock having tubular, square, hexagonal or other cross section could also be cut by the apparatus described herein.

A semi-cylindrical trough 34 consists of two portions, one of which is secured to the nearer vertical plate 18, the other of which is secured to the slicing apparatus 44. The two portions have interlaced fingers to permit them to collapse or extend as the slicing apparatus 44 moves longitudinally with respect to the axis of the cylindrical stock 32. A further trough 35 is similarly constructed in two interlaced, collapsible portions secured respectively to the slicing apparatus 44 and to the farther vertical plate 18. A semi-annular flange 36 is provided on the left-hand end of the trough 34.

A hydraulic cylinder 38 is affixed horizontally to the nearer vertical plate 18, and the piston 39 of the cylinder 38 is connected at 40 to the left-hand horizontal member 24 and thus to the plate member 28. The hydraulic cylinder 38 is employed to move the sliding frame 22 longitudinally of the slide-shafts 20 in a manner to be explained hereinafter. During the reciprocating movements of the sliding frame 22 with respect to the slide-shafts 20, the uncovered portions of the slide-shafts 20 are protected by four concertina sleeves 42, one end of each of which is attached to a vertical plate 18, while the other end is connected to its respective cylindrical sleeve 26. The concertina sleeves 42 are adapted to expand and contract as the sliding frame 22 reciprocates.

Figure 2:
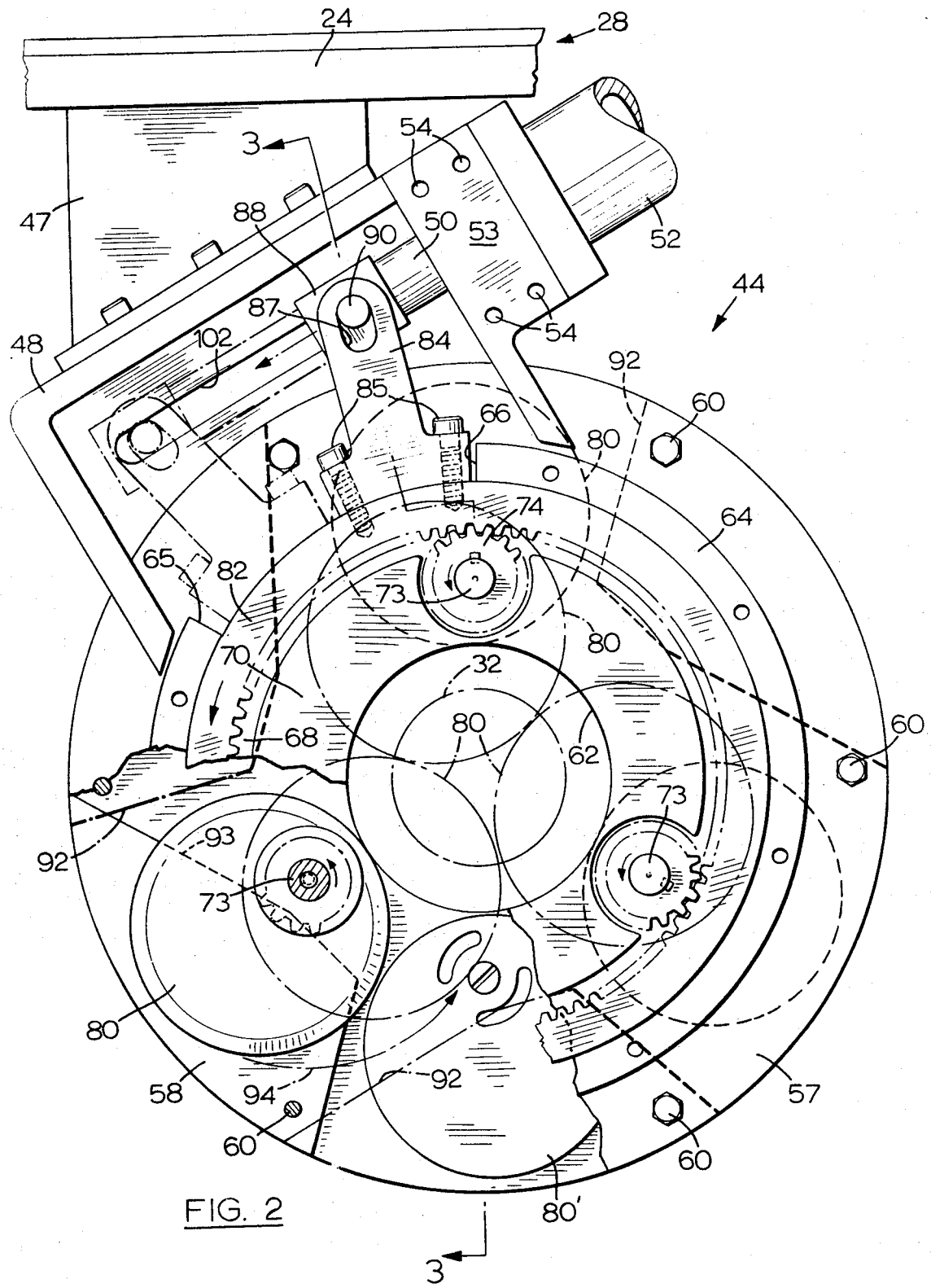
FIG. 2 is a partly broken-away elevational view of the knife holding and operating portion of the apparatus shown in FIG. 1, taken along the line 2—2 in FIG. 1.

Referring now to both FIGS. 1 and 2, it will be seen that the sliding frame 22 supports beneath it a slicing apparatus shown generally by the number 44.

Figure 3:
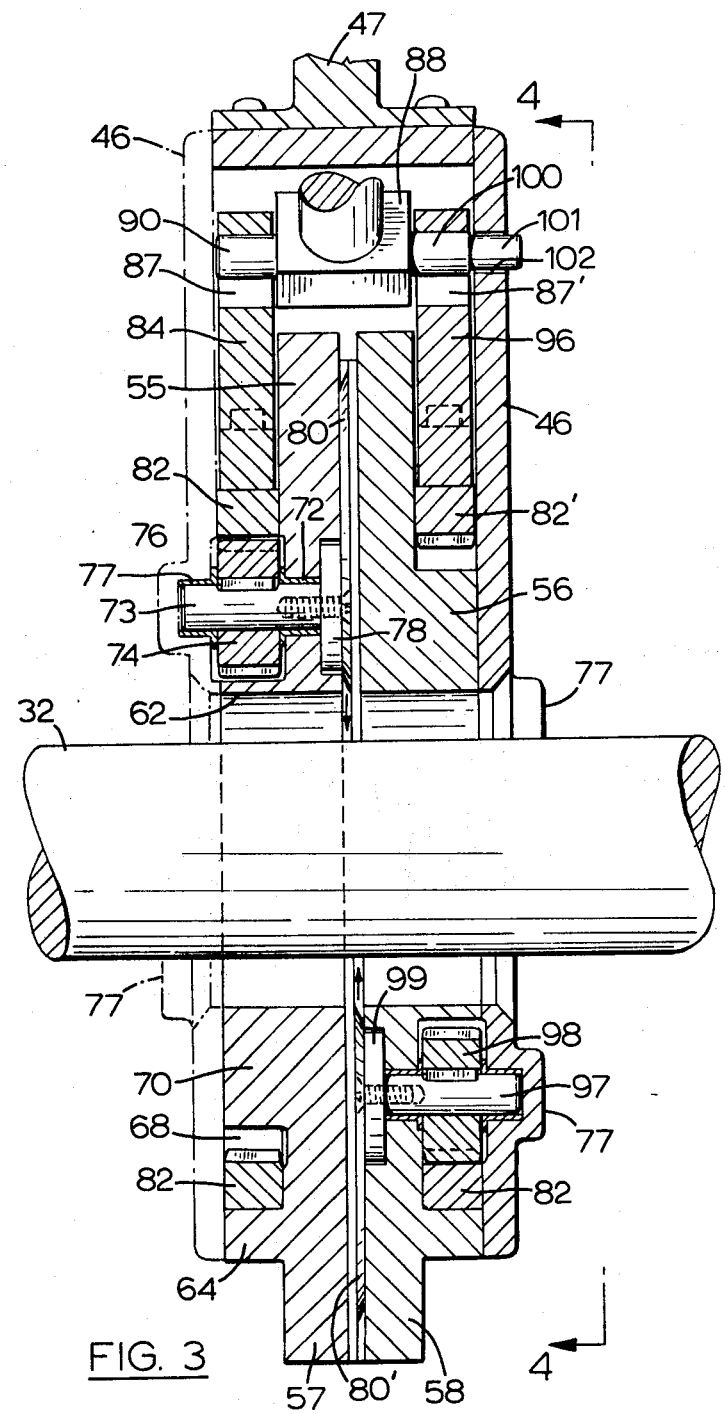
FIG. 3 is an axial sectional view taken on the line 3—3 in FIG. 2.
Figure 4:
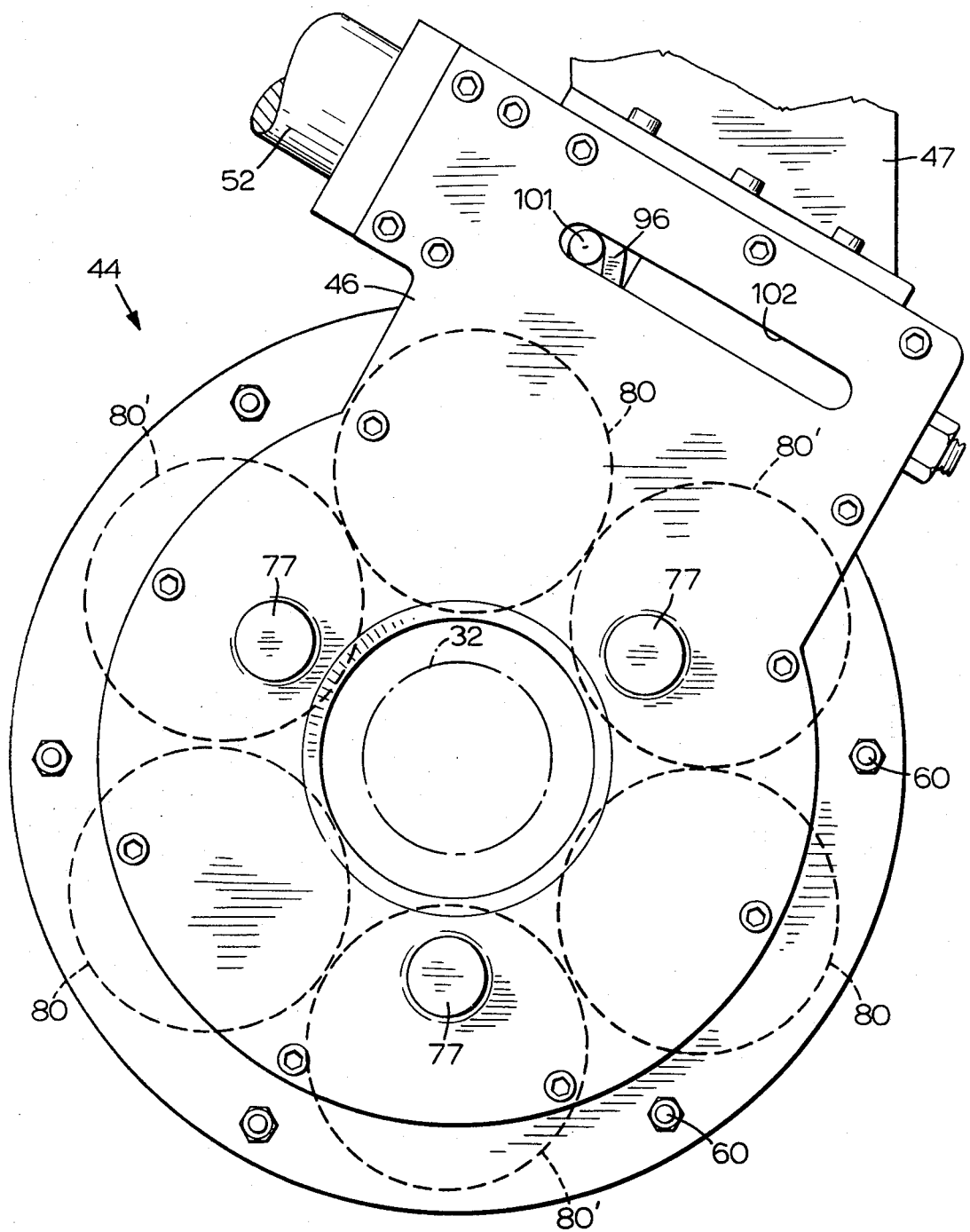
FIG. 4 is an elevational view taken on the line 4—4 in FIG. 3.

The slicing apparatus 44 includes two outside cladding plates 46, between which blades and gears are sandwiched, and in FIG. 2 one of the cladding plates (the nearer one in FIG. 1) has been removed to show some of the internal parts. Portions of these internal parts have been broken away in FIG. 2 to reveal still other parts. Referring also to FIG. 3, the right-hand cladding plate 46 is shown in solid lines, while the left-hand cladding plate has been removed and is shown in broken lines only. Depending from the plate member 28 is an angle brace 47 which is bolted to an upper housing 48 within which a piston 50 of a cylinder 52 is adapted to reciprocate. The cylinder 52 is secured to, and opens through, a block 53 which is in turn fixed to the upper housing 48. The block 53 has tapped holes 54 on either side, into which the cladding plates 46 can be bolted.

Between the two cladding plates 46 are two bearing plates 55 and 56 which are bolted together and to the cladding plates. The bearing plate 55 will first be described with reference to FIGS. 2 and 3. Bearing plate 55 has an outer flange 57 adapted to be bolted firmly to a corresponding flange 58 on the bearing plate 56. The appropriate bolts 60 are seen in FIG. 2. The bearing plate 55 has a central aperture 62 through which the cylindrical stock 32 is adapted to pass.

Bearing plate 55 has an annular lateral ridge 64 which, as can be seen in FIG. 2, terminates at the locations 65 and 66 and is therefore not a completed annulus. Immediately inwardly of the annular lateral ridge 64 is an annular gallery 68 the inner limit of which is defined by a boss 70 which surrounds the central aperture 62.

The bearing plate 55 supports three bearing sleeves 72 of which only one is visible in FIG. 3, and through each of these bearing sleeves 72 is journalled a shaft 73. The three shafts 73 in the bearing plate 55 are located at the vertices of a hypothetical equilateral triangle, and are equidistant from the centre of the central aperture 62. Keyed to each shaft 73 is a pinion gear 74. The outer end of each shaft 73 is adapted to be received in an outer bearing sleeve 76 within an integral cap structure 77 protruding from the left-hand cladding plate 46.

On its inner end, each shaft 73 has affixed to it a co-axial disc 78, and bolted securely to each disc 78 is an eccentrically mounted circular knife 80. Thus, the shaft 73, the pinion gear 74 and the circular knife 80 all rotate together.

Looking now at FIG. 2, the uppermost circular knife 80 is shown in dotted line at its retracted position, and is shown in dot-dash line at the end of its cutting stroke. In order to cause the shaft 73 to rotate the circular knife 80 so that it moves between the two positions shown in FIG. 2, a ring gear 82 is provided. The ring gear is received snugly but slidably within the annular gallery 68 against the lateral ridge 64, and has internal teeth adapted to mesh with the external teeth of the pinion gears 74.

Bolted to the ring gear 82 is a radial arm 84 which in FIG. 2 is shown in solid lines in its first position and in dot-dash lines in its second position. The radial arm 84 is secured by bolts 85 to the exterior of the ring gear 82 and has a longitudinally elongated slot 87 in its end remote from the ring gear 82. As can be seen in FIGS. 2 and 3, the piston 50 which moves in the cylinder 52 carries a block 88 at its end, and the block 88 supports a lateral shaft 90 adapted to register in the slot 87. As the piston 50 reciprocates from its solid line position shown in FIG. 2 to its dot-dash line position in the same Figure, the radial arm 84 is carried between the two positions shown in FIG. 2 and as a result the ring gear 82 oscillates angularly through approximately 30° of arc. This oscillation of the ring gear 82 causes the pinion gears 74 to rotate first in one direction and then in the other, thereby carrying the eccentrically mounted circular knives 80 between their outer and inner position as shown in FIG. 2.

In order that the bearing plates 55 and 56 can be clamped and bolted tightly together while still leaving a narrow space for the free movement of the circular knives 80, each plate has on its inner surface three lands. The three lands on the bearing plate 55 have their outlines identified by the number 92, and it will be noted that the lands are identical in shape and are spaced at 120° from each other. The other bearing plate 56 also has three lands of the same shape, but its three lands are displaced 60° from the lands of the bearing plate 55. In FIG. 2, only one of the lands of bearing plate 56 is shown, and its outline is identified by the number 93. Only one of the lands of bearing plate 56 has been shown in FIG. 2 in order to avoid confusion. It will thus be seen that each land of one of the bearing plates overlaps at its corners two of the lands of the other bearing plate. This can be seen at the lower left of FIG. 2, where the land 93 overlaps the two adjacent lands 92. It is at this overlapping that the two bearing plates contact each other, and it is this overlapping of the lands which provides the space within which the circular knives 80 can move.

As seen in FIG. 2, the spacing of the lands on the bearing plate 55, for example, leaves three channels within which the circular knives 80 can move. For example, the path of the outer edge of the lower left-hand knife 80 mounted in bearing plate 55 is shown by the circular arrow 94 in FIG. 2.

Generally speaking, the bearing plate 56 has the same components and same features as the bearing plate 55, and these include a radial arm 96 always aligned with the radial arm 84, three shafts 97 displaced 60° from the shafts 73, a ring gear 82' exactly aligned and moving in tandem with the ring gear 82, three pinion gears 98 (only one visible in FIG. 3), three discs 99 mounted on the shafts 97 (only one visible in FIG. 3), and three eccentrically mounted circular knives 80' mounted on the discs 99. The block 88, as seen in FIG. 3, carries a second lateral shaft 100 aligned with the lateral shaft 90 and passing through a slot 87' in the radial arm 96. The lateral shaft 100 has a reduced extension 101 which slides in a slot 102 in the cladding plate 46.

Figure 5:
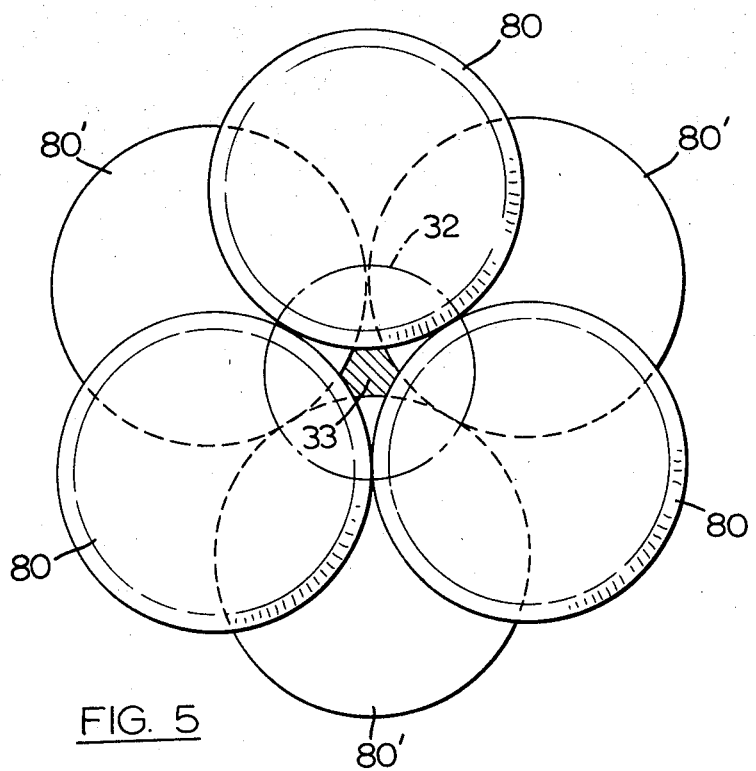
FIG. 5 is a schematic drawing showing the circular knives only, at their position of furthest entry into the tubular stock.

As seen in FIG. 2, the innermost position of each set of three circular knives 80 and 80' is that in which the outermost periphery of the circular knife edges are resting tangentially against each other. If there were only three knives cutting into the cylindrical stock 32, this arrangement would leave a "core" of generally three-pointed shape in the centre of the tubular stock 32. The fact that there are two sets of three triangularly related circular knives, each set being displaced 60° from the other, results in a six-sided "core" 33 in the centre of the stock 32, as seen clearly in FIG. 5. FIG. 5 is a view of the knives and the stock only, with the knives all in their innermost position.

It is to be understood that it is possible to arrange the contour of the knife-edges of the circular knives such that the knives of each set overlap each other slightly when in their inner-most position. The effect of such an arrangement would be to reduce the size of the centre core 33 in tubular stock 32.

In operation, the actuation of the two cylinders 52 and 38 is automatically timed so that the following sequence takes place.

With the piston of cylinder 52 withdrawn to its solid line position of FIG. 2, cylinder 38 is actuated to shove the sliding frame 22 to its far right-hand position in FIG. 1. It is assumed that tubular stock 32 is continuously being extruded, is passing through the central aperture 62 and through the central openings 30, and is resting on the semi-cylindrical troughs 34 and 35. When the sliding frame 22 reaches its farthest right-hand position, the cylinder 52 is actuated so that the piston 50 moves to its dot-dash line position in FIG. 2, thus rotating the two ring gears 82 and 82' in the counter-clockwise direction as seen in FIG. 2, thereby rotating all six shafts 73 and 97 and carrying the six circular knives 80 and 80' from their outer to their inner positions. As the knives move from their outer to their inner positions, they automatically cut into the periphery of the continuously moving tubular stock 32, the entry of all six knives being simultaneous. As soon as the knives enter the stock, the movement of the stock 32 is imparted through the knives to the sliding frame 22 which automatically moves leftwardly along with the tubular stock 32 until it reaches its leftward limit position as seen in FIG. 1. During this leftward movement of the sliding frame 22, the cylinder 38 presents no resistance whatever to the movement of the frame. As soon as the knives have reached their innermost cutting position as seen in FIG. 5, the piston 50 is retracted into the cylinder 52, and this disengages the knives and the sliding frame from the stock 32. Thereupon, the cylinder 38 is again actuated so that the piston 39 will move the sliding frame 22 back to the right-hand limit position in FIG. 1.

The timing of this sequence of cylinder operation is adjusted to give a desired length of tubular stock between sequential cuts.

It will be appreciated that, because of the eccentric mounting of the circular knives 80 and 80', the knife edges at the periphery of the circular knives do not exhibit exact radial movement into the stock 32. Rather, the motion of the knives as they move from their outer to their inner positions causes the knife blades to perform a true "cutting" operation rather than a straight shearing operation, the difference being that in a cutting operation the knife blade undergoes some translation in the direction of the blade. It is the difference between the action of a meat chopper and a carving knife. Because of the slicing action of the knife blades rather than a straight chopping or shearing action, a much neater cut in the stock 32 results, and little or no breakage or crumbling at the periphery of the stock is encountered.

It is also to be understood that, while the embodiment hereinabove disclosed utilizes six knives set at 60° intervals, this number of knives is not critical. It is considered that a minimum of three knives would suffice to cut solid tubular stock leaving a triangular core, and that the maximum number of knives depends on considerations of overlapping. One possible arrangement would have two sets of two circular knives each, the knives of one set being diametrically opposed and arranged at 90° with respect to the knives of the other set. The innermost positions for the four knives could be such that the knives of each given set remained somewhat spaced apart, thus leaving a four-sided core.

I claim:

1. Cutting apparatus for stock comprising:

a framework supporting a plurality greater than two of rotatable shafts spaced equidistant around said framework, at least three of the shafts lying at the vertices of a hypothetical equilateral triangle centered on stock positioned through said framework and constituting a first set of shafts, the remainder and equal number of rotatable shafts being equidistant around said framework and constituting a second set of shafts, all said rotatable shafts being parallel to said stock, each shaft carrying an eccentrically mounted, plate-like circular cutting knife adapted for rotation with the shaft, all knives having the same radius and eccentricity, the knives of the first set being aligned with their cutting edges in the same plane so that when rotated to their innermost positions their edges are tangent to one another, the knives of second set being aligned with their cutting edges in a plane closely adjacent said first mentioned plane and being adapted to overlap the knives of the first set when all knives are in their innermost position, whereby the knives perform a scissor-like action on said stock as the knives approach their innermost positions, and means for causing all the shafts to rotate simultaneously to carry the knives simultaneously toward and away from said stock, the knives at their furthest inward position cooperating for cutting said stock.

2. The invention claimed in claim 1, in which the shafts are equidistant from said stock, each shaft being locked to a toothed gear wheel, and in which said means includes an internally toothed ring gear meshing with the teeth of each said gear wheel, and means for rotating said ring gear with respect to the framework.

3. The invention claimed in claim 2, in which said last mentioned means includes a fluid operated cylinder fixed to the framework and having its piston connected to said ring gear such that reciprocation of the piston causes rotary oscillation of said ring gear.

4. The invention claimed in claim 1, in which said stock continuously advances axially, and in which the framework is mounted on guideway means for reciprocation in the direction parallel with said stock, whereby said stock can be cut by said knives as the stock and the framework advance together.

5. The invention claimed in claim 4, in which the frame-work is drawn in the direction of stock advance by the engagement of the knives with the stock, and in 6. Cutting apparatus for stock comprising:
   a framework supporting six rotatable shafts spaced at 60° intervals around said stock and parallel therewith, three of the shafts lying at the vertices of a hypothetical equilateral triangle centered on stock positioned through said framework and constituting a first set of shafts, the other shafts being equidistant from said stock and constituting a second set of shafts,
   each shaft carrying an eccentrically mounted, plate-like circular cutting knife adapted for rotation with the shaft, all knives having the same radius and eccentricity, the knives of the first set being aligned with their cutting edges in the same plane so that when rotated to their innermost positions their edges are tangent to one another, the knives of the second set being aligned with their cutting edges in a plane closely adjacent said first mentioned plane and being adapted to overlap the knives of the first set when all knives are in their innermost position, whereby the knives perform a scissor-like action on said stock as the knives approach their innermost positions, and
   means for causing all the shafts to rotate simultaneously to carry the knives simultaneously toward and away from said stock, the knives at their furthest inward position cooperating for cutting said stock.

7. Cutting apparatus for axially advancing stock, the apparatus comprising:
   guidway means parallel with the direction of advance of the stock,
   a framework adapted to reciprocate on said guideway means,
   support means for supporting from the framework a first set of three rotatable shafts and a second set of three rotatable shafts, all shafts being parallel, the three shafts of the first set being locatefshafts being parallel, the three shafts of the first set being located at the vertices of a first hypothetical equilateral triangle centered on the stock, the three shafts of the second set being located at the vertices of a second hypothetical equilateral triangle centered on the stock, the second triangle being displaced angularly from the first triangle by 60°,
   each shaft carrying an eccentrically mounted circular cutting knife keyed to the shaft for rotation therewith, the three knives on a given set of shafts having the same diameter and eccentricity, the knives on the first set of shafts lying in the same plane, the knives on the second set of shafts being positioned to overlap the knives on the first set of shafts when all shafts are rotated,
   and means for causing all shafts to rotate simultaneously to carry the knives simultaneously toward and away from the stock to cut the same with the knives on the first set of shafts cooperating with the knives on the second set of shafts to perform a scissors-like action on the stock, 8. The invention claimed in claim 7, in which said last mentioned means includes a toothed gear wheel locked to each shaft, each gear wheel having the same number of teeth, and an internally toothed ring gear meshing with the teeth of each said gear wheel, a cylinder having a reciprocating piston, the cylinder being attached to the framework and the piston being attached to the framework and the piston being attached to the ring gear whereby reciprocation of the piston causes rotary oscillation of the ring gear, thereby rotating the shafts to carry the knives toward and away from the stock.

* * * * *